United States Patent
Shah et al.

(10) Patent No.: US 7,461,129 B2
(45) Date of Patent: *Dec. 2, 2008

(54) METHODS AND SYSTEMS FOR END-USER EXTENSIBLE ELECTRONIC MAIL

(75) Inventors: Milan M. Shah, Issaquah, WA (US); Keith K. Lau, Bellevue, WA (US); Jeffrey C. Stamerjohn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/314,528

(22) Filed: Dec. 21, 2005

(65) Prior Publication Data

US 2006/0106942 A1    May 18, 2006

Related U.S. Application Data (63) Continuation of application No. 09/464,348, filed on Dec. 15, 1999, now Pat. No. 6,999,993.

(51) Int. Cl.
*G06F 15/16* (2006.01)

(52) U.S. Cl. .................... 709/207; 709/224
(58) Field of Classification Search ............... 709/206, 709/207
See application file for complete search history.

(56) References Cited

U.S. PATENT DOCUMENTS

| | | | |
|---|---|---|---|
| 5,917,489 A * | 6/1999 | Thurlow et al. | 715/809 |
| 6,363,415 B1 * | 3/2002 | Finney et al. | 709/206 |
| 2002/0099681 A1 * | 7/2002 | Gainey et al. | 707/1 |

* cited by examiner

*Primary Examiner*—Ario Etienne
*Assistant Examiner*—Barbara N Burgess
(74) *Attorney, Agent, or Firm*—Workman Nydegger (57) ABSTRACT

Methods and systems for creating a full-featured, individually customized email system by allowing end-users of an electronic mail system to extend standard electronic mail protocol for the creation of user-defined commands that are recognizable and executable by an electronic mail system and that can alter processing performed after a server accepts a piece of electronic mail. Routine events are raised during the communication of information and processing of data that give rise to the execution of registered commands. The commands are registered in an event-binding database and include standard commands and user-defined commands that are executed according to priority.

12 Claims, 6 Drawing Sheets

METHODS AND SYSTEMS FOR END-USER EXTENSIBLE ELECTRONIC MAIL

CROSS-REFERENCE TO RELATED APPLICATIONS

This application is a continuation of U.S. patent application Ser. No. 09/464,348, filed Dec. 15, 1999, and entitled "METHODS AND SYSTEMS FOR END-USER EXTENSIBLE ELECTRONIC MAIL" and which incorporated herein by reference.

BACKGROUND OF THE INVENTION

1. The Field of the Invention

The present invention relates to the establishment and support of end-user extensible electronic mail. More specifically, the present invention relates to systems and methods for allowing end-users of electronic mail to extend standard electronic mail protocol for the creation of user-defined commands that are recognizable and executable by an electronic mail system and that can alter processing performed after a server accepts a piece of electronic mail.

2. The Prior State of the Art

With the advent of the personal computer, individuals everywhere at anytime rely on electronic mail (email) as a principal mode of communication and means for exchanging information. Electronic communication is at times utilized between individuals down the hall, or alternatively between individuals located around the globe. Email has become a valuable tool for individuals and businesses alike. Individuals worldwide keep in touch with friends and family through the use of email messages by sending electronic letters, birthday cards and holiday greetings, which include text, graphics and/or animation. Businesses use email systems to exchange word processing documents, spreadsheets, data objects, electronic forms, graphic images, and so forth. Businesses also employ email systems to schedule and reschedule meetings, and at times prefer electronic communication in order to memorialize a conversation. Electronic newspapers and newsletters are delivered to email boxes, mass mailings are performed electronically for advertising purposes, and print commands are regularly sent to email accounts. In today's world, email messaging has become such a popular mode of communication and means for exchanging information that collections of valid email addresses have become a valuable commodity.

While electronic mail systems are used worldwide, the discrete functions required or desired by the various users of electronic messaging systems for running the email communications are not identical. Some individuals use email systems that only support text, while other individuals require email systems that support detailed formatting and graphic imaging. At times users send electronic messages for casual conversational purposes only, while other times the sender of the electronic message requires that the exchange be encrypted to preserve the confidentiality of the information. Many users receive such a high volume of electronic mail that they rely on flags to indicate the priority level of the communication, whereas other users receive email so infrequently that they eagerly wait for the delivery of an email message in their box. Various senders of electronic messages require their email system to track the message sent to ensure delivery, to verify that the message has been read, and/or to notify the sender when the message is either undelivered or unread. Alternatively, other senders of email are made aware that their message was sent upon the delivery of a responding message from the receiver. At times, email users employ functions that provide visual or audible notification of the arrival of an electronic message while they are involved in other applications, whereas other users are required to log into their email account to verify the arrival of an electronic message.

While email users require and/or desire a plethora of specialized features, electronic mail systems have been traditionally distributed as a "one size fits all" package. An electronic mail system has been made available to computer users as a bundled package that includes all of the commands, features and formats of that specific system. Thus, when a user desires a specific command, function or format that is not included in the system package, that user must frequently wait until the designer of the email system includes the specialized feature in a newer version of the email package. In the upgraded version, the new feature is generally bundled with a variety of other features. Thus, this traditional method for obtaining the desired feature forces users to upgrade the entire email package in order to pick up the incremental feature, and frequently requires users to receive features that are not desired or needed simply because they were bundled with the desired feature. This process of needing to upgrade the system in order to obtain a desired feature results in the consumption of large amounts of money and/or storage space for individuals and businesses.

It would therefore be desirable for an email user to be able to enhance his/her email system by receiving a specifically desired feature without being required to also receive undesired features. It would also be desirable for an email user to be able to freely create individually customizable features for his/her own email system. It would be desirable for a commercially produced electronic mail system to support the user-created customized features. Furthermore, it would be desirable if an email user could create a user-created feature that could be set up as a default in that user's email box, thereby customizing the various defaults of the user's email system. Any electronic mail model that could exhibit such capabilities would be particularly useful for preserving cost and storage space by allowing a user to add user-customized features to commercially available electronic mail messaging systems.

SUMMARY OF THE INVENTION

The present invention relates to methods and systems for allowing end-users of electronic mail (email) to extend standard electronic mail protocol for the creation of user-defined commands that are recognizable and executable by an electronic mail system and that can alter processing performed after a server accepts a piece of electronic mail. Under the present invention, a user can add or remove features of an email system to create a full-featured, individually customized email system.

The methods and systems of the present invention provide a mechanism whereby user-defined commands are able to extend standard email protocol, without deviating from the protocol specification, and are also able to alter processing performed after a server accepts a piece of electronic mail. According to the present invention, an inbound network protocol engine manages a client's connection to a configured port on a server machine. A protocol event dispatcher examines the commands sent from the client and determines if a corresponding user-defined command has been registered in an event-binding database. If the command is registered, the server executes the command and uses the results to compute a response to the client. Alternatively, if the command is not registered in the database, the server executes a default command and uses the results of that default command to generate a response to the client.

After the client/server protocol exchange is performed and the server receives a piece of email, the mail is submitted to a queuing module for the processing of newly arrived mail. The processing is performed according to operations registered in the event-binding database, comprising standard and/or user-defined commands. The mail is subsequently categorized according to the registered operations for the performance of any directory list expansion and/or address translation. An intelligent routing mechanism determines the course the mail is to take for its transmission to its final destination, and forces the mail to follow the route.

A link object is created to allow a registered operation to perform preparatory processing for link management, such as determining the time for scheduling a link with a subsequent server. A connection manager determines the number of connections that are to be made with the server and requests that an outbound protocol engine initiate the connections. The outbound protocol engine allows a registered operation to implement its own name for network address mapping, and uses standard protocol as a default to resolve any conflicts between network names and addresses. Once the connection is established with the subsequent server, the outbound protocol engine, on a session-by-session basis, allows registered operations to employ extensions on standard protocol. The session is then terminated after the mail is transferred.

Therefore, under the present invention, end-users of electronic mail are able to create user-defined commands that extend standard electronic mail protocol, without deviating from the protocol specification, that are recognizable and executable by an electronic mail system, and that can alter processing performed after a server accepts a piece of electronic mail. As such, a user can add or remove features of an email system to create a full-featured, individually customized email system.

Additional features and advantages of the present invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to both methods and systems for allowing end-users of electronic mail to create user-defined commands that extend standard electronic mail protocol, without deviating from the protocol specification, that are recognizable and executable by an electronic mail system, and that can alter processing performed after a server accepts a piece of electronic mail. As such, the present invention allows a user to add or remove features of an email system to create a full-featured, individually customized email system.

In order to facilitate the disclosure of the present invention and corresponding preferred embodiment, the ensuing description is divided into sub-topics that focus on exemplary computing and hardware environments, registering user-defined commands, inbound server protocol, data processing operations, and outbound server protocol. This manner of employing sub-topics to facilitate the disclosure is for illustration purposes only and is not to be construed as limiting in any way. Furthermore, it will be appreciated from a review of the ensuing description that the present invention is not limited to the sub-topics employed, but rather includes a variety of aspects, as presented herein. Moreover, the scope of the present invention is to be indicated by the appended claims rather than by the ensuing description.

Exemplary Computing and Hardware Environments

Embodiments of the present invention may comprise a special purpose or general-purpose computer including various computer hardware, as discussed in greater detail below, and may also include computer-readable media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, FEPROM, CD-ROM or other optical disk storage, magnetic disk storage or other magnetic storage devices, or any other medium that can be used to store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Thus, any such a connection is properly termed a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
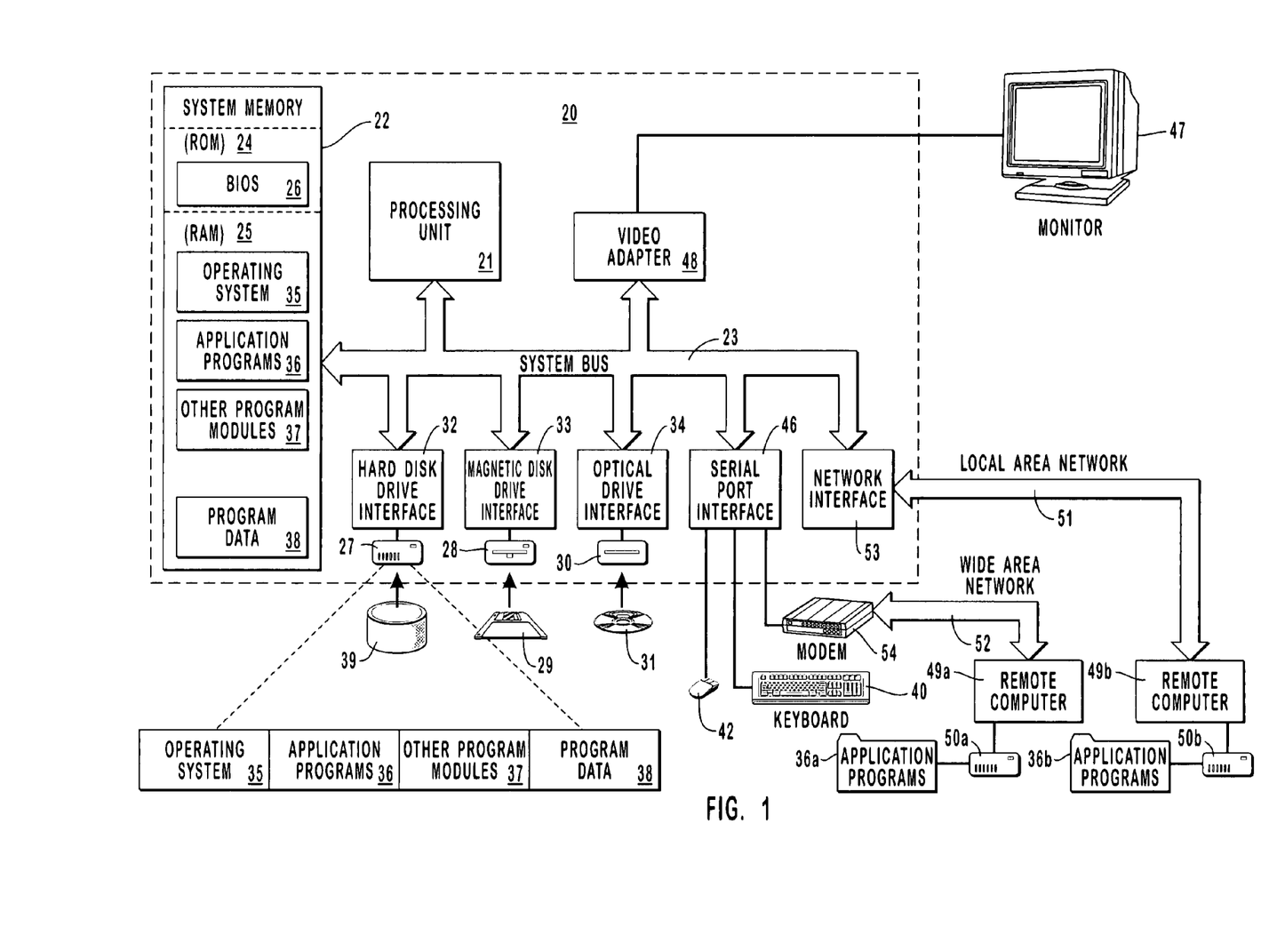
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
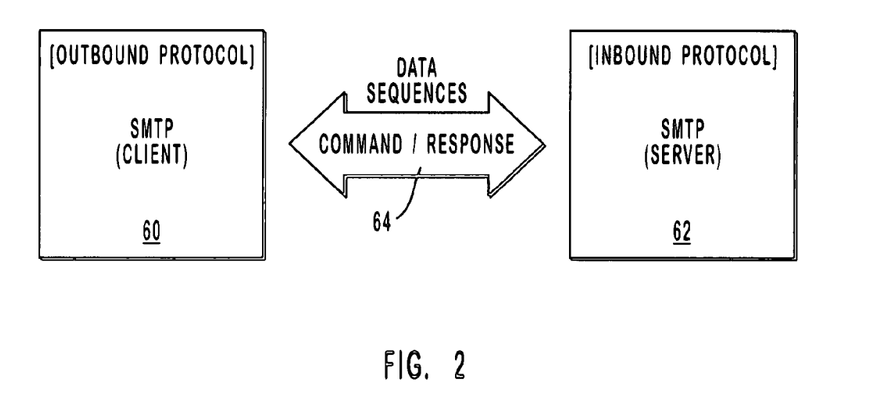
FIG. 2 illustrates a basic client/server configuration for the transfer of information to a final destination.

Referring now to FIG. 2, a basic configuration is illustrated between two enterprises for the transfer of information, such as electronic mail (email). An enterprise can comprise, by way of example, a special purpose or general-purpose computer including various computer hardware, as discussed above. In transferring information, a first enterprise initiates a connection to a second enterprise for the sending of information. The second enterprise acknowledges and responds to the initiation in order to receive the information.

In the basic configuration, as illustrated in FIG. 2, the enterprise that initiates the connection and begins the transmission of information is referred to as the client, such as client 60. Likewise, the enterprise with whom the client connects and who responds to the client is referred to as the server, such as server 62. The connection between client 60 and server 62 is made possible by hardwired links, wireless links, or by a combination of hardwired or wireless links. It is across the one or more links that client 60 and server 62 exchange information, such as data sequences 64, illustrated as a command transmitted followed by a response.

The transmission of data sequences 64 are performed under standard electronic mail transfer protocol as provided in RFC821, entitled "Simple Mail Transfer Protocol" (SMTP), which has the objective of transferring email in a reliable and efficient manner. While both the client and server employ SMTP, under the present invention an end-user of electronic mail can extend the SMTP to create user-defined commands that are recognizable and executable by an electronic mail system and that can alter the data processing performed after server 62 accepts a piece of electronic mail from client 60, as will be further explained below. Therefore, in this description and in the claims, the protocol utilized by a client is referred to as "outbound protocol" or "outbound client protocol" and includes the SMTP and any extensions of the SMTP. Similarly, in this description and in the claims, the protocol utilized by a server is referred to as "inbound protocol" or "inbound server protocol" and includes the SMTP and any extensions of the SMTP.

Figure 3:
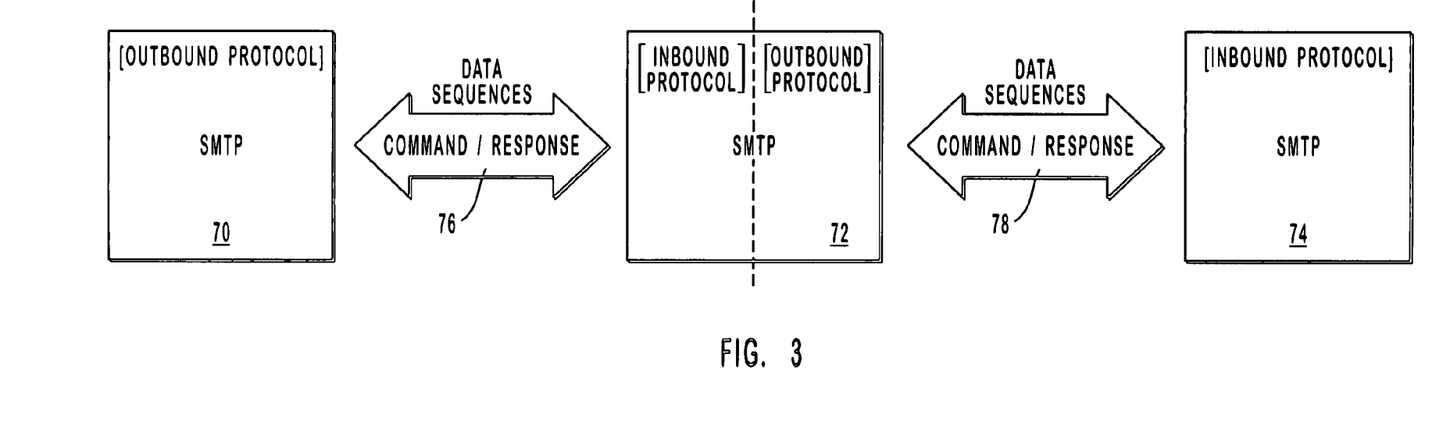
FIG. 3 illustrates a basic client/server configuration for the transfer of information, where the receiving server is an intermediate destination.

In the basic configuration illustrated in FIG. 2, the transfer of information between a client and a server depicts the server as the ultimate destination for the email message. When sending email, the electronic message routinely hops through a chain of servers until it eventually reaches the final destination. In FIG. 3, a diagram is provided that illustrates a basic configuration for the exchange of data sequences where the server is an intermediate destination rather than an ultimate destination.

Referring to FIG. 3, information, including a piece of email, is transmitted from enterprise 70 to enterprise 72 and then to enterprise 74. In the exchanges between enterprises 70 and 72, enterprise 70 functions as the client sending the information and employing outbound protocol, whereas enterprise 72 functions as a server receiving the information, responding to the client and employing inbound protocol. In FIG. 3 the exchange between enterprises 70 and 72 are illustrated as data sequences 76.

Once the email message is transmitted from enterprise 70 to enterprise 72, the mail is relayed to its next destination or hop. The second exchange is between enterprises 72 and 74 and is illustrated by data sequences 78. In this second exchange enterprise 72 functions as the client and employs outbound protocol to initiate a link to enterprise 74 and to transmit the email message. Enterprise 74 meanwhile functions as the server and employs inbound protocol to respond to the client.

Thus, in the example illustrated in FIG. 3 where enterprise 74 is an intermediate destination, the email message is first transmitted from enterprise 72 to enterprise 74, and then the message is transmitted from enterprise 74 to enterprise 76. In the first transmission enterprise 74 functions as the server employing inbound protocol. In the subsequent transmission enterprise 74 functions as the client employing outbound protocol. Therefore, under the present invention, enterprise 74 can execute user-defined commands as part of the process of receiving an email message and/or as part of the process of sending an email message. Moreover, under the present invention, enterprise 74 can also execute user-defined commands as part of the processing of the email message while the message is at enterprise 74.

Registering User-Defined Commands

As mentioned above, under the present invention a full-featured, individually customized email system is created by allowing an end-user of the email system extend the SMTP for the creation of user-defined commands that are recognizable and executable by the email system and that can alter processing performed after a server accepts a piece of mail. An extension to the SMTP includes a user-defined command, such as, by way of example, X-FOO, and can be transmitted either before or after a standard SMTP command. However, in order for the user-defined command to be executed, the user-defined command must be registered and given a priority level for execution.

Figure 4:
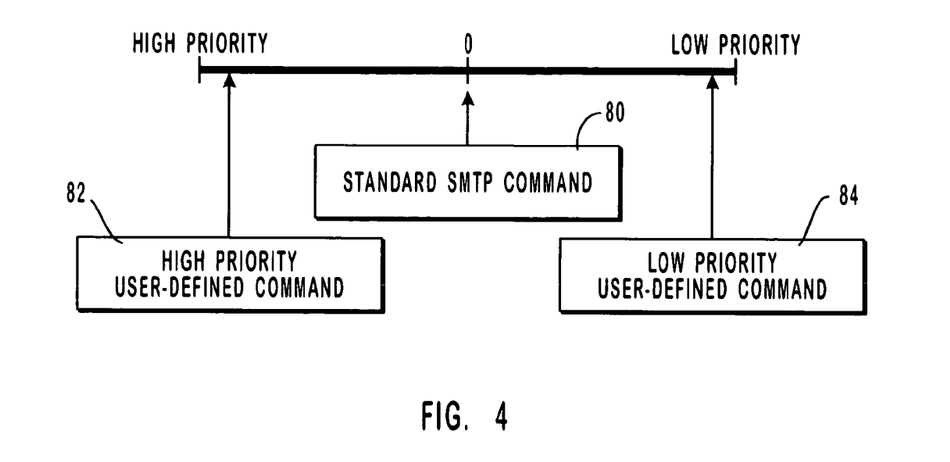
FIG. 4 illustrates an exemplary prioritization of user-defined commands in relation to a standard SMTP command.

Every standard SMTP and user-defined command is given a priority level, and under the present invention a user can define or modify the level of priority for a given command. In accordance with RFC821, standard SMTP commands are given a neutral priority as a default, as illustrated by standard SMTP command 80 of FIG. 4. If desired, an end user can set a user-defined command at a priority level higher than that of a standard SMTP command, as illustrated by high priority user-defined command 82, or alternatively can set a user-defined command at a priority level lower than that of a standard SMTP command, as illustrated by low priority user-defined command 84. By setting the priority of the user-defined commands that are registered to perform various operations, the user-defined commands can be set to either augment or bypass standard default commands.

The execution of the commands is performed according to a priority scale—from highest priority to lowest priority. Therefore, user-defined commands can be set at a priority level higher than the priority level of a standard default command in order to augment the exchange or processing procedure, or to bypass the standard default command entirely. Similarly, the exchange or processing can also be augmented by a user-defined command being set at a priority level lower than the priority level of a standard default command.

Prior to setting the priority of a user-defined command, and in order for the user-defined command to be executed, the command must be registered in a database, such as an event-binding database. The database is a resource that includes all available operations for the exchange of information and processing of data. It includes the standard default commands and must include the user-defined commands in order for the user-defined commands to become available operations.

Figure 5:
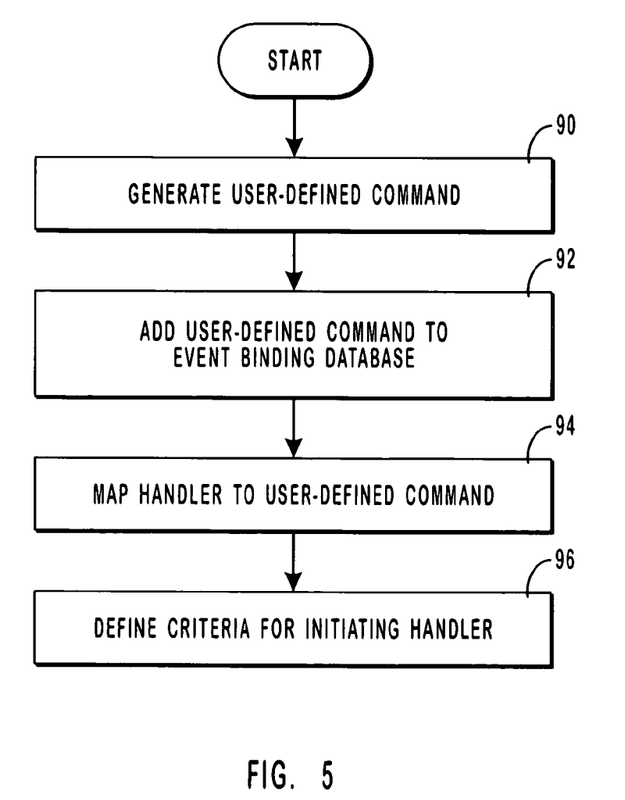
FIG. 5 provides an exemplary method for a user to register a user-defined command in an event-binding database.

FIG. 5 illustrates, by way of example, a method for an end-user to include a user-defined command in the event-binding database by registering the user-defined command with the database. In step 90, the end-user generates the user-defined command. Under the present invention, an end-user is able to create and/or customize commands in order to construct a full-featured, individually customized email system. In one embodiment of the present invention, "X-" is utilized to create end-user commands, such as X-FOO. The user-defined command can be created to perform any operation that the end-user desires regarding the transfer of information or processing of data.

In step 92, the user-defined command generated in step 90 is added to the event-binding database. By including the user-defined command into the database, the command can be an accessible operation. Step 94 maps a specific handler to the user-defined command, the handler being a chain of events used to manipulate the user-defined command in a sequence prescribed by the end-user. In step 96, criteria for initiating the handler to manipulate the user-defined command is defined. Thus, upon creating the command, adding it to the event-binding database, mapping a handler to the command, and defining the criteria for initiating the handler, the user-defined command is registered and becomes an accessible operation for the customization of information exchange or data processing.

Inbound Server Protocol

Figure 6:
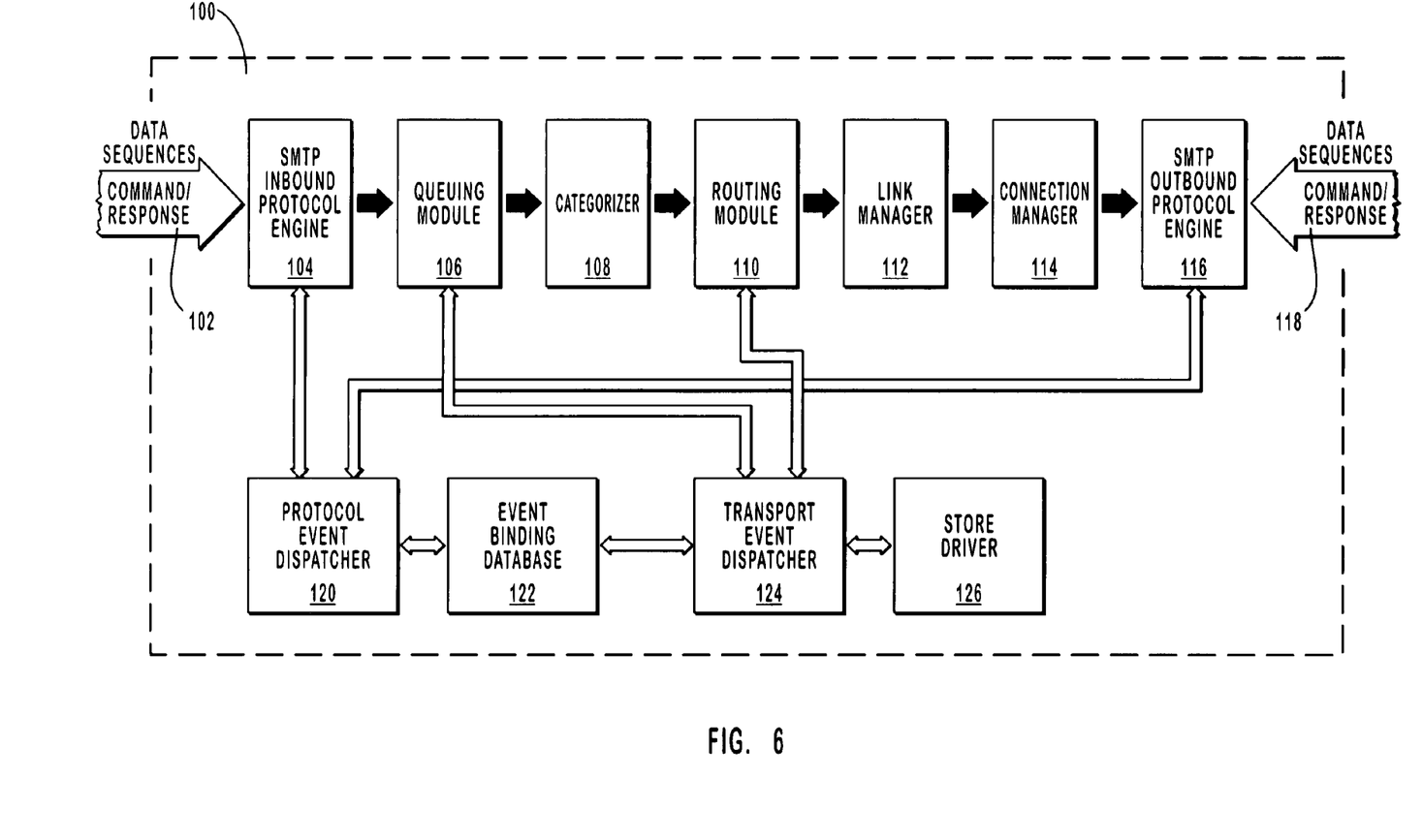
FIG. 6 illustrates a system that provides an exemplary sequence for processing a piece of mail within a server that is an intermediate destination.

As provided above, inbound server protocol includes the SMTP and any extensions of the SMTP, and is utilized by a server in a client/server exchange relationship for communicating with the client and for receiving information sent from the client. Referring to FIG. 6, an exemplary system is illustrated for the sequence of receiving information, such as an email message, processing the message, and transmitting the message to a subsequent hop. The enterprise illustrated is enterprise 100, which is connected to a client (not shown) and exchanges data sequences with the client, as illustrated by data sequences 102.

The client connects to a configured port of enterprise 100 via TCP/IP protocol. This connection is managed by SMTP inbound network protocol engine 104. Under the present invention, the inbound server protocol includes SMTP and extensions of SMTP to allow for the use and execution of standard default commands and user-defined commands.

As provided above, the standard default commands and the user-defined commands are registered in a database, such as event binding database 122 of FIG. 6. In the database, a description is provided for the various commands along with information about the corresponding handlers. Under the present invention, multiple handlers can be associated with a user-defined command and each of the handlers can be set with its own priority level so that they will be called in the order prescribed by an end-user.

As a command is transmitted from the client to enterprise 100, the command is received by SMTP inbound protocol engine and is immediately handed off to protocol event dispatcher 120. This act of SMTP inbound protocol engine 104 handing off a command to protocol event dispatcher 120 is referred to as "raising an event." The command is handed off to protocol event dispatcher 120 for the management of accessible operations.

All operations are registered in event-binding database 122, and protocol event dispatcher 120 manages the operations by determining which of the registered commands will be executed upon the raising of an event. The determination is made by protocol event dispatcher 120 consulting with event-binding database 122 at the time that an event is raised to determine if a user-defined command that corresponds to the raised event has been registered in the database. If a user-defined command has been registered then it is executed, otherwise the standard default command is executed, as will be further explained below.

Figure 7:
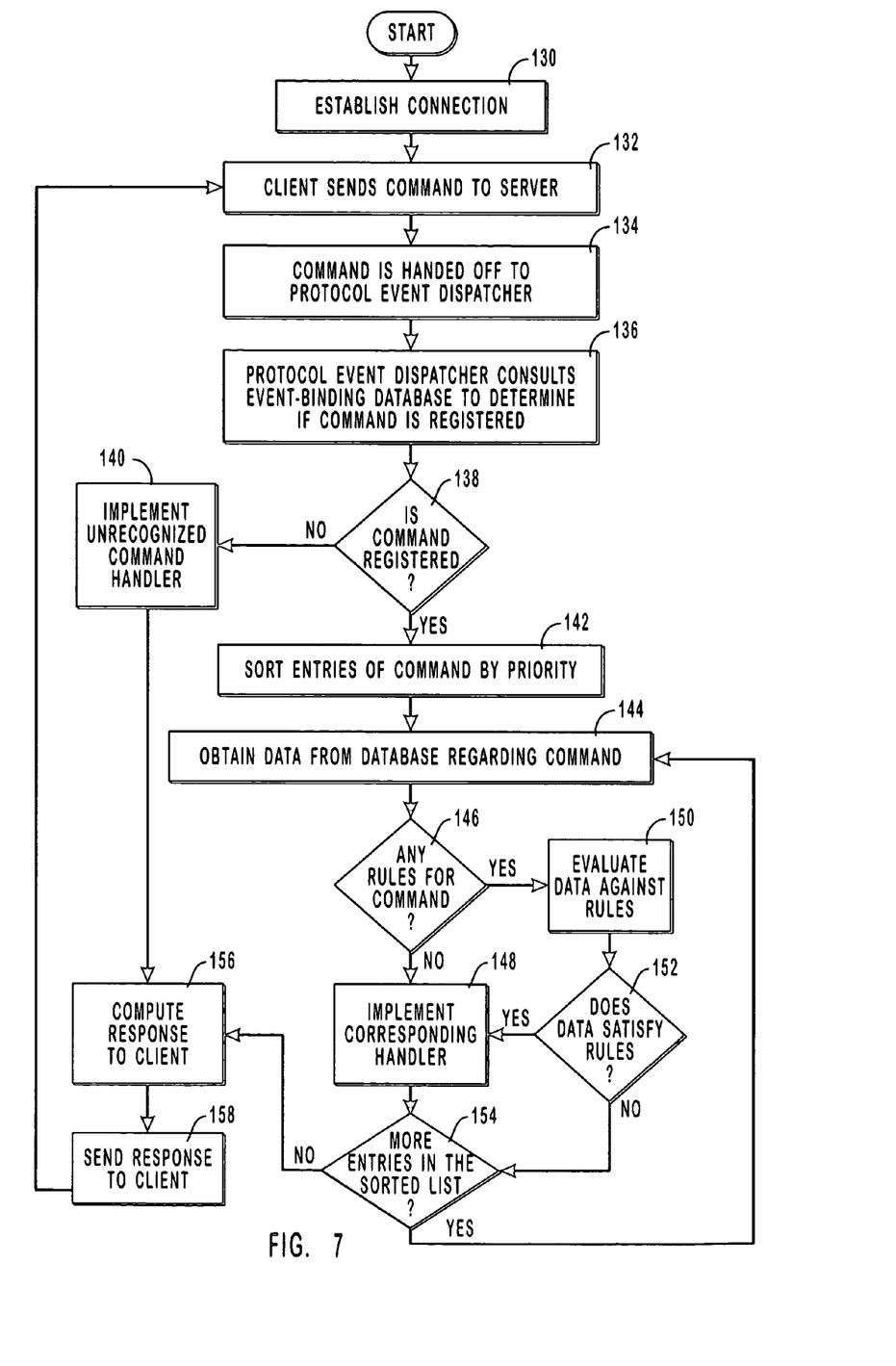
FIG. 7 provides an exemplary method for utilizing inbound server protocol.

Referring now to FIG. 7, a flowchart is provided that illustrates an exemplary method in which SMTP inbound protocol engine 104 and protocol event dispatcher 120 utilize the inbound server protocol for determining which of the commands registered in event-binding database 122 will be executed and for returning a response to the client. Referring first to step 130, a connection is made between the client and the server (the server in this case being, by way of example, enterprise 100 of FIG. 6). The client/server connection includes standard SMTP exchanges-such as a standard HELO/EHLO sequence, as defined in RFC821. The client can choose to send either the HELO or the EHLO to identify itself. If the client sends the HELO command, then the server responds with a numerical status code and a greeting string. If the client sends the EHLO command, then the server replies with a multi-line response that advertises all of the extensions that the server supports, such as, by way of example, BDAT, SIZE, X-FOO, etc. This identification of what the server can support is important because the client is then able to transmit the email message to the client in a manner that can be supported by the server. Thus, the client sending a HELO/EHLO command and the server responding to the command establishes the connection illustrated in step 130.

In step 132 the client sends a command to the server as part of data sequences 102 of FIG. 6. The command sent to the server by the client can be either a standard SMTP command or a user-defined command. The server does not make a distinction as to whether the command is a standard SMTP or a user-defined command at this point, instead, upon receipt of the command the SMTP inbound protocol engine simply hands the command directly to the protocol event dispatcher in step 134. This "handing off" of the command to the protocol event dispatcher "raises an event," which initiates a search for a command to be executed.

As will be further explained below, if the command is a standard SMTP command or a recognizable user-defined command, then the command is handed off to the protocol event dispatcher, thereby raising an event and invoking the imminent execution of one or more corresponding commands that are registered in the event-binding database. Alternatively, if the command that is sent from the client to the server includes a handler that cannot be identified by the server (i.e. the command does not match with any entry in the event-binding database), then the server ignores the command and implements the "NULL handler" to generate an appropriate error string that is sent to the client.

The NULL handler catches everything that the server does not know how to handle and returns a generic "500 Unrecognized Command" error to the client. Within embodiments under the present invention, end-users can include user-defined handlers around the NULL handler, using different priorities, to customize special error handling behaviors. The inclusion of a user-defined handler is performed in the same way that a user-defined command is registered. In one embodiment, the command includes an asterisk (*) reserved in the binding database for user-defined NULL handlers.

Once step 134 raises the event, step 136 is followed, which includes protocol event dispatcher 120 of FIG. 6 consulting event-binding database 122 for a determination as to whether or not a user-defined command related to the event raised is registered in the database. If the determination at decision block 138 as to whether or not a user-defined command is registered in the database is negative, then execution proceeds to step 140 where the NULL handler is implemented to generate a generic response to the client indicating that the server does not recognize the command received, and thus the command is rejected as erroneous. Also implemented, in order of priority, are any handlers for registered user-defined commands relating to the receiving of an unrecognized command from a client.

Alternatively, if the determination at decision block 138 is that user-defined commands have been registered, then in step 142 the relevant user-commands are sorted by priority to prepare for the sequence in which they are to be executed. This presumes that more than one command exists in the database relative to the event raised. On the other hand, if only one command exists, the sorting process is trivial and execution proceeds to step 144.

In steps 144 through 152, each entry from the sorted list obtained from step 142 is processed individually. For each entry, step 144 queries event-binding database 122 of FIG. 6 for any data associated with the entry. Decision block 146 determines whether, as part of the data obtained, a rule exists. A rule is a user-defined criterion or set of criteria that must be satisfied in order for the associated handler to be implemented. A rule can be arbitrarily complex and may vary from one embodiment to another. Rules may be, but are not limited to, conditions that must be met in order to comply with standard protocol, or conditions that must otherwise be satisfied to ensure the logical and correct operation of the server.

If decision block 146 determines that a rule does not exist, then the handler is immediately implemented in step 148.

Alternatively, if a rule is found to exist, then step 150 will gather all-necessary data and evaluate the data against the rule. If decision block 152 finds that the data satisfies the rule, then the corresponding handler is implemented in step 148. Alternatively, if the data does not satisfy the rule, the handler is not implemented. Whether the handler is implemented or not, execution proceeds to decision block 154 for the determination as to whether or not there are more entries in the sorted list from step 142. If more entries exist, execution returns to step 144 so that steps 144-152 can be followed until all entries of the sorted list are processed.

At this point, whether the unrecognized command handler has been implemented in step 140 or the handlers that correspond to the user-defined commands have been implemented in step 148, execution proceeds to step 156 where a response is computed for the client. The response is sent to the client in step 158 and the server waits until the client sends another command to the server. Hence, according to an embodiment of the present invention, the inbound protocol allows an end-user to register user-defined commands and corresponding handlers in an event-binding database for the execution of the commands upon raising a relevant event. Thus, the ability to specify per-handler rules enables run-time decisions to be made to ensure the correct and logical operation of the server, and the coherency of the data involved. Furthermore, the ability to extend a rule to encompass any conditional statement or expression for yielding a value of either TRUE or FALSE upon evaluation of the rule, either respectively allows or disallows the implementation of the handler.

In another embodiment of the present invention, a refinement to the extension of the SMTP protocol is performed. This embodiment includes an asynchronous capability. When a client issues an authentication command, a "look up" is performed to determine if the authentication is valid. This "look up" can be very lengthy and therefore can hold up the connection. As a result, and according to the embodiment, an asynchronous framework allows the "look up" to be performed in such a way that all of the data relative to the authentication is gathered and queued into an asynchronous queue for transmitting the data to the client, thereby eliminating a potential obstruction in the communication.

Data Processing Operations

Once the inbound protocol is used for the client/server communication, and the server receives the electronic mail message, the message undergoes a series of data processing operations within the enterprise. As part of the data processing operations of the present invention, transport events are raised that are specific to some point in the processing, and the manner in which the events are raised resemble the raising of events on the protocol side.

Under the present invention, user-defined commands can alter data processing operations that are performed. The data processing operations are performed on the electronic message after the message is received by the enterprise and until it is sent to a subsequent hop, in the event that the enterprise is not the ultimate destination.

Referring again to FIG. 6, once the inbound protocol exchange has been completed by SMTP inbound protocol engine 104 and protocol event dispatcher 120, an embodiment of the present invention submits the email message received to queuing module 106. At the queuing module, a transport event, such as MESSAGE ARRIVAL, is raised and allows for the execution of user-defined commands for pre-processing the newly arrived email message. The event is raised once queuing module 106 indicates to transport event dispatcher 124 that the message has arrived. Transport event dispatcher manages the execution of commands during the data processing phase. Upon the raising of an event, transport event dispatcher 124 consults event-binding database 122 to determine if any related user-defined commands are registered in the database. If one or more commands are registered, then the corresponding handlers are implemented for execution of the user-defined commands. By way of example, such user-defined commands related to a MESSAG ARRIVAL event can include scanning of the email message for a virus, adding recipients to the message, and so forth. Alternatively, if no related-user-defined command is registered in the database, the corresponding standard commands are executed.

Immediately following the MESSAGE ARRIVAL event, a PRE-CATEGORIZER event is raised. This PRE-CATEGORIZER event gives rise for the opportunity for user-defined commands to, for example, perform DL expansion, configure address translations such as looking up a forwarding address for email recipients, etc. As above, passing of the event to transport event dispatcher 124 raises the event, thereby causing transport event dispatcher 124 to consult event-binding database 122 for determining which corresponding commands and accompanying handlers will be executed.

The electronic message is next placed in categorizer 108, which looks up in a user database all of the sender and recipient addresses corresponding to the message for forwarding addresses and expanding distribution lists. Subsequently, various transport events are raised, thereby providing the opportunity for execution of registered commands. By way of example, the transport events can include BEGIN CATEGORIZATION, BUILD QUERY, BUILD QUERIES, SEND QUERY, SORT QUERY RESULT, PROCESS ITEM, EXPAND ITEM, COMPLETE ITEM, and/or END CATEGORIZATION.

After categorization, a POST-CATEGORIZER event is raised, which again allows for the execution of user-defined commands that may be registered in event-binding database 122, and the electronic message is inserted into a pre-routing queue. The pre-routing queue is part of routing module 110 of FIG. 6. Routing module 110 is used to determine the best route to a specific server. While the message is in the pre-routing queue, two transport events are raised, namely, a GET MESSAGE TYPE event for classifying the message and a GET NEXT HOP event for determining the next best destination for the message. The GET NEXT HOP event is raised for each distinct destination for the email message. A user-defined command can hook these two transport events and force the email message to follow a specific route to its final destination. The GET NEXT HOP event is used to determine the route for the email message and to create a Link object. The email message is then passed to link manager 112.

Once the next destination has been determined in routing module 110, link manager 112 determines the schedule for creating a link with the subsequent enterprise. Once a link is scheduled, the link is given to connection manager 114 for the determination of the number of connections that need to be made with the subsequent enterprise. Connection manager 114 also requests SMTP outbound protocol engine 116 to initiate the required number of connections. The email is then transmitted to the next enterprise, as indicated by data sequences 118.

Thus, according to an embodiment of the present invention, within an enterprise an email message is passed from the SMTP inbound protocol engine 104, to the SMTP outbound protocol engine 116 via queuing module 106, categorizer 108, routing module 110, link manager 112, and connection manager 114, respectively. Throughout the passing of the message, transport events are routinely raised to yield opportunities for registered user-defined commands to be executed for the altering of the data processing performed. The events are raised to the transport event dispatcher 124, which manages the execution of commands registered in event-binding database 122 that alter the processing of data. Store driver 126 powers the transport event dispatcher 124. Once the communication link is scheduled with the subsequent enterprise for the transmission of the email message, SMTP outbound protocol engine 116 establishes the connection and transmits the email message to the subsequent enterprise, as illustrated in FIG. 6 by data sequences 118, and as will be further explained below.

Outbound Client Protocol

Figure 8:
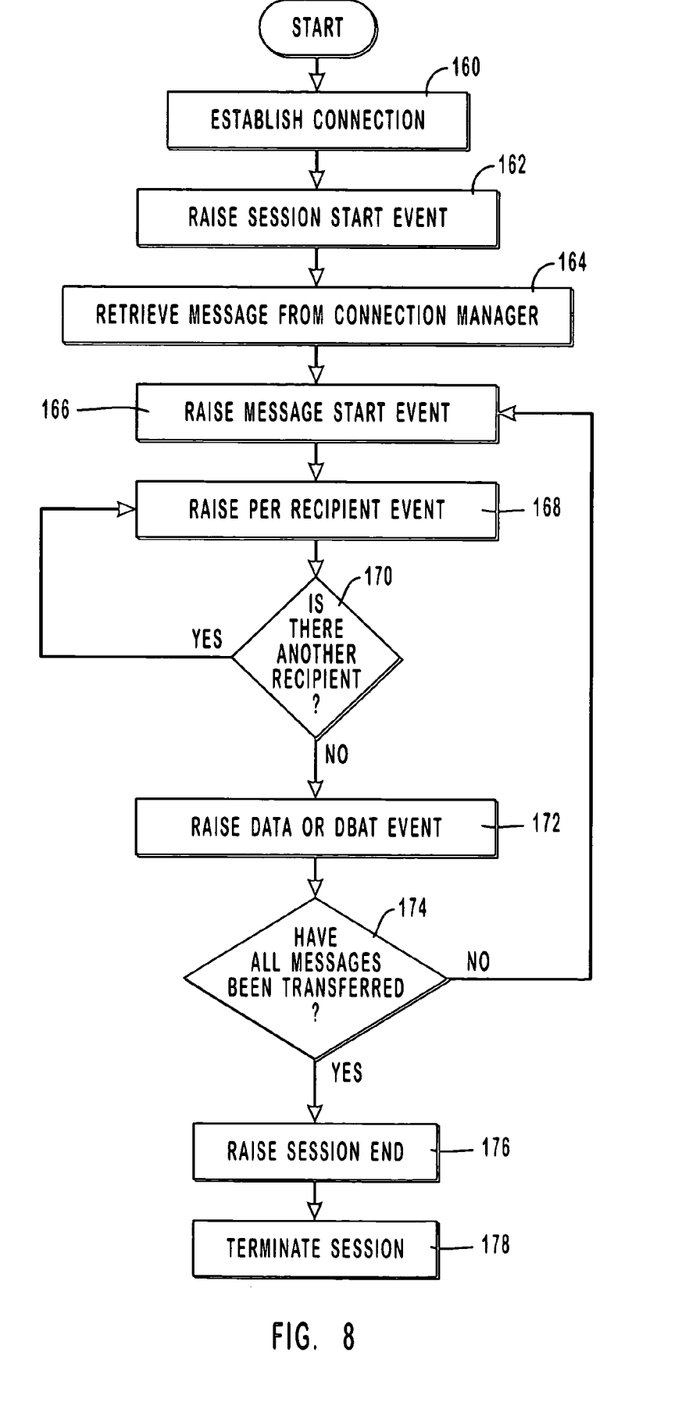
FIG. 8 provides an exemplary method for utilizing outbound client protocol.

As mentioned, outbound client protocol includes SMTP and SMTP extensions and is utilized by an enterprise (client) that is transmitting information. Referring now to FIG. 8, a flowchart is provided that illustrates an exemplary method for an SMTP outbound protocol engine to utilize the outbound client protocol.

Once SMTP outbound protocol engine 116 of FIG. 6 has established a connection with a subsequent enterprise, as illustrated by step 160 of FIG. 8, the SESSION START protocol event is raised in step 162. This event allows registered user-defined commands related to the event to extend the protocol with per session extensions. In step 164, SMTP outbound protocol engine 116 of FIG. 6 retrieves the electronic message from connection manager 114, and a MESSAGE START event is raised in step 166. Execution then proceeds to step 168, where for each recipient of the electronic message, SMTP outbound protocol engine 116 of FIG. 6 raises a PER RECIPIENT protocol event for the execution of commands specific to each recipient of the email message.

Decision block 170 determines if there exists another recipient for the email message. If there is another recipient, execution returns to step 168 to raise the PER RECIPIENT event. Alternatively if there is not another recipient, execution proceeds to step 172 to raise the DATA OR BDAT event. Decision 174 then determines whether or not all of the messages have been forwarded. If all of the messages have not been forwarded, execution returns to step 166 in order that the MESSAGE START EVENT, the PER RECIPIENT event, and the DATA OR BDAT event are raised for each electronic message transferred during the session with the server. Once decision block 174 has determined that all of the electronic messages have been transferred, or that the electronic message has been transmitted to all recipients, execution proceeds to step 176 where a SESSION END event is raised for the conclusion of information exchange, before the session is terminated in step 178 so that handlers can still converse with the server before the session is dropped.

The present invention is presented by the foregoing embodiments that allow end-users of an electronic mail system to extend standard electronic mail protocol for the creation of user-defined commands that are recognizable and executable by an electronic mail system and that can alter processing performed after a server accepts a piece of electronic mail to thereby create a full-featured, individually customized email system. The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computing system for use in a messaging system used for exchanging information, the system utilizing standard Internet protocol, the computing system comprising one or more computer-readable storage media having computer-executable instructions for implementing a method for extending the protocol to allow for the ability to customize messaging operations performed on an electronic message without deviating from the protocol specification, wherein the method comprises:

storing a standard command, wherein the standard command is based on a standard Internet protocol, the standard command having an assigned priority;

storing a user-created command, wherein the user-created command is based on extensions of the standard Internet protocol, and wherein the standard command and the user-created command are used for manipulating the message;

assigning a user-defined priority to the user-created command relative to an assigned priority of the standard command for executing the user-created command, wherein assigning any user-defined priority to the user-created command lower than the assigned priority of the standard command causes the standard command to be executed with the user-created command, such that the user-created command augments the standard command, and wherein assigning any user-defined priority to the user-created command that is higher than the assigned priority of the standard command causes the user-created command to bypass the standard command, and such that the user-created command is executed without the standard command being executed; and executing at least one of the standard command or the user-created command according to the assigned priority.

2. A computing system as recited in claim 1, wherein the standard command is stored in a first database.

3. A computing system as recited in claim 2, wherein the user-defined command is stored in a second database.

4. A computing system as recited in claim 3, wherein the first database and the second database are the same database.

5. A computing system as recited in claim 1, wherein the method further includes an act of identifying the at least one of the standard command and the user-created command that is to be executed based upon a determination of whether the user-created command is registered in an event-binding database.

6. A computing system as recited in claim 5, wherein the method further includes an act of registering the user-created command into an event-binding database, and prior to executing the user-created command an act of determining that the user-created command is registered in the event-binding database.

7. A computing system as recited in claim 1, wherein the priority of the standard command is a neutral priority.

8. A computing system as recited in claim 7, wherein the assigned priority of the user-created command is a priority other than a neutral priority.

9. A computing system as recited in claim 8, wherein the method further includes an act of sorting at least the user created command and the standard command in a database based upon their priority prior to executing the at least one of the standard command and the user-created command.

10. A computing system as recited in claim 1, wherein the method further includes modifying one of the assigned priorities.

11. A computing system as recited in claim 1, wherein the standard command is assigned a neutral priority prior to assigning the user-defined priority to the user-created command.

12. A computing system as recited in claim 1, wherein execution of the user-created command effectively prevents the standard command from being executed.

* * * * *